D. SIMS & J. HOSICK.
Wheat Steamer and Equalizer.
No. 167,414. Patented Sept. 7, 1875.
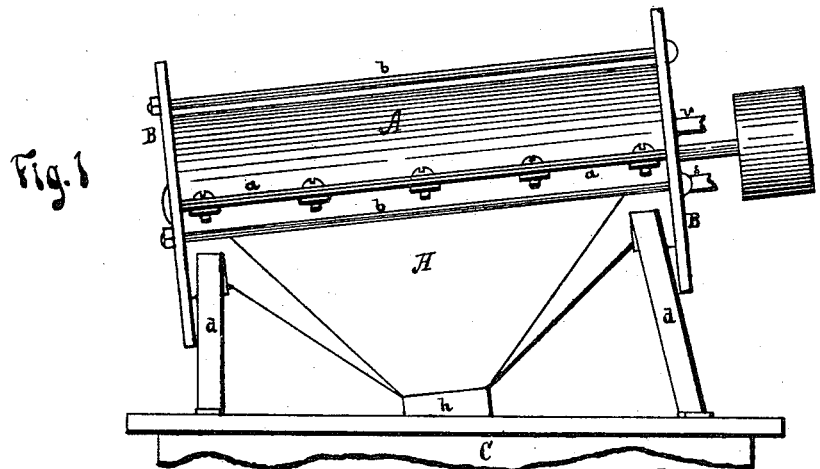
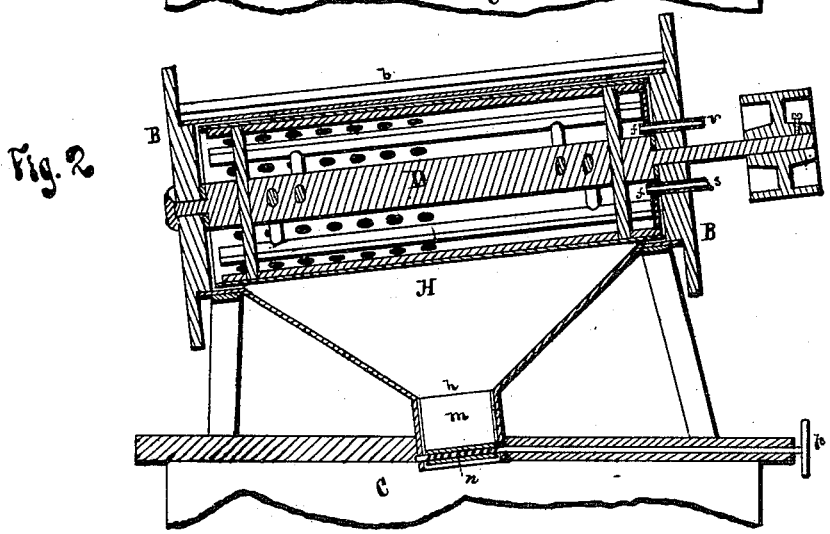
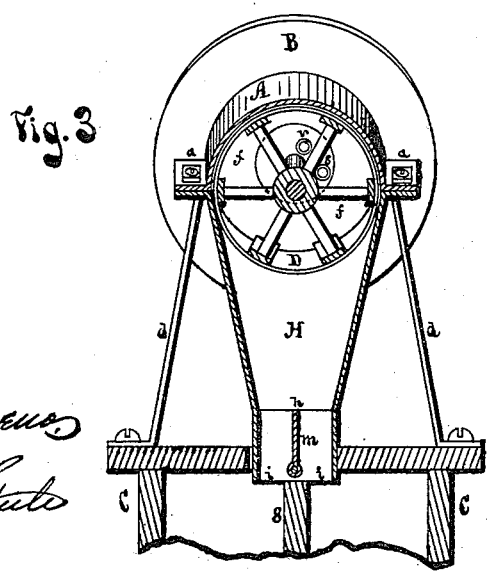
WITNESSES
INVENTORS
David Sims
John Hosick
Attorneys

UNITED STATES PATENT OFFICE.

DAVID SIMS AND JOHN HOSICK, OF LEAVENWORTH, KANSAS.

IMPROVEMENT IN WHEAT STEAMERS AND EQUALIZERS.

Specification forming part of Letters Patent No. 167,414, dated September 7, 1875; application filed November 6, 1874.

*To all whom it may concern:*

Be it known that we, DAVID SIMS and JOHN HOSICK, both of Leavenworth, in the county of Leavenworth and State of Kansas, have invented a new and valuable Improvement in a Wheat Steamer and Equalizer; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a front elevation of our device, showing the outer cylinder, the wheat-bin below, and the hopper between. Fig. 2 is a longitudinal and central section of the same, showing the inside of the outer and inner cylinders, and of the hopper through which the grain passes into the bin below. Fig. 3 is a central cross-section of the same, looking toward the higher end of the outer cylinder, and showing the valve at the mouth of the bin, and its rod, together with apartments of the bin and their partition, in section.

Our invention is a grain steamer and equalizer; and consists in the novel construction, arrangement, and operation of the same, for the purpose of equably and uniformly dampening grain, more particularly wheat, and then again drying it before grinding, embracing the following elemental features: Two hollow cylinders, an outer and stationary one, situated almost horizontally, closed at both ends, and within which the other one is suitably revolved, said outer cylinder having its lower portion shaped into a hopper, leading into a bin below, upon the top of which the feet of the two pairs of legs are fastened, which support said cylinder in a suitably-inclined position, said inner cylinder, open at both ends, having also suitable holes pierced through a portion of its shell, and suitably revolved within said outer cylinder, upon a shaft or reel passing through both cylinders; a grain bin or chest, divided lengthwise by a partition into two equal compartments, into each of which the throat of said hopper leads; a wing-valve, placed lengthwise the middle of said hopper-throat, kept in a vertical position by a torsion-spring, and moved by a handled rod extending from said valve beyond one of the ends of said bin; and, finally, two pipes, leading through the higher end of said outer cylinder, the one to conduct grain and the other steam into said inner cylinder, all of which is hereinafter more fully described, and illustrated by the accompanying drawings, in which the same letters designate identical parts of our device in the different figures, respectively.

The letter A represents said outer cylinder, made of suitable sheet metal, the upper portion being a regular semi-cylinder, with longitudinally-flanged edges $a$, by which to suitably fasten it to the upper flanged edges of said lower or hopper-shaped portion H. The ends of said cylinder, together with said hopper portion, being circular in form, are closed by suitable heads B, of cast metal or otherwise, which are firmly secured in place by rods or nut-bolts $b$, by which contrivance said outer cylinder is not only made steam-tight, but readily taken apart for repairing or readjusting any of the machinery within. Said outer cylinder is firmly supported, together with its hopper beneath, by two pairs of legs, $d$, each pair of unequal length, in a suitably-inclined position, upon the top of said bin C, as shown, said hopper H being narrowed downward to a throat, $h$, which leads into said bin below. The letter D represents said inner cylinder, consisting of a metallic shell, open at both ends, and covering a reel, the arms of which pass perpendicularly through a central axle or shaft, which supports, in suitable bearings in the said cylinder-heads B, the said inner cylinder, and by which the same is suitably revolved, closely fitting within said outer cylinder, as shown. The higher end of said cylinder D is partially closed, as shown, by an annular head, $f$, suitably fastened just within said end, said head having an annular opening around the aforesaid shaft just large enough to allow grain and steam to be introduced within, and yet not permit said grain to drop between the said heads $f$ and B.

From the lower end of cylinder D, about one-half of the shell is pierced with suitable holes, in longitudinal rows, to allow the steamed grain to drop into the hopper beneath. The said grain bin or apartment C consists of a suitably sized and shaped chamber, through the central portion of the ceiling or roof of which is cut a suitable hole, into which said hopper-throat $h$ is fittingly introduced, as shown. Said bin is divided into two equally-sized compartments by a partition, $g$, running lengthwise through the middle, and which is so cut out immediately beneath said throat $h$ that the bottom edge of said throat will fit tightly down upon the top edge of said partition, and thus make an equally-sized opening into each compartment. The said throat $h$ is likewise equally divided by a wing-valve, $m$, kept at rest in a vertical position by a spring, $n$, acting by torsion, and oscillated to either side by the handled rod $p$, so as to close over either of said openings $i$, and thus shut off, at will, the descending grain from either compartment. The letters $v$ and $s$ represent, respectively, two metallic pipes, the one leading from a grain-bin, and the other from a steam-boiler, through suitable holes in the higher cylinder-head B, and the said annular opening around the aforesaid shaft into the inner cylinder D.

The operation of our device, thus constructed and arranged, is as follows: Having connected motive power with the drum on the end of the shaft of cylinder D, and thus put it in rapid revolution, grain and steam are introduced, as aforesaid, respectively, through the pipes $v$ and $s$. While passing, by centrifugal force, from the inside of the revolving and sliding mass along said shaft toward the outside along the lower portion of the said cylinder-shell, the grain becomes sufficiently dampened and softened by steam, when it drops through the said holes of said shell into the hopper H, and on through its throat $h$ into one of the compartments of the bin C, the said wing-valve $m$ being temporarily closed over the mouth of the other. When one compartment becomes filled with the steamed grain the said valve is turned and closed over its mouth, thus opening the mouth of the other compartment, which, in its turn, may be filling with freshly-steamed grain, while that in the former compartment is suitably and equably drying, which latter process occupies a period from ten to fifteen hours of time. When said time has elapsed, the coats of the grain having become sufficiently cooled and toughened without being made brittle, said grain is run out of said compartment of the bin C to be ground. Thus said compartment becomes emptied and ready again to be filled with steamed and heated grain.

This operation can be repeated as long as desired by alternately filling, cooling, and emptying the said compartments, and that without stopping or delaying the constantly-steaming process performed by the other portion of our device.

Again, the said compartments being, as aforesaid, of equal size and capacity, and the steamed grain being allowed to remain in each alternately for equal times, it becomes equably dried in said equally-allotted masses, thereby giving greater certainty of a uniform quality to said masses for grinding.

Furthermore, the coat or bran portion of the grain, by the aforesaid process, is prepared to yield more readily all the inclosed flour without being cut or broken into fine pieces or shorts, and the flour is more completely and wholly separated from said coat, resulting in a larger quantity, if not superior quality, of flour, much cleaner and larger bran, and all this with much decreased waste of power in the grinding; therefore,

What we claim as our invention, and desire to secure by Letters Patent, is—

1. The outer and stationary cylinder A, provided with the closing heads B and the nut-rods $b$, in combination with the inclosed revolving, perforated, and annular-headed cylinder D, the grain-pipe $v$, and the steam-pipe $s$, substantially as and for the purposes specified.

2. The partitioned bin C, in combination with the hopper-bottomed cylinder A and the handled wing-valve $m$, substantially as and for the purposes specified.

In testimony that we claim the above we have hereunto subscribed our names in the presence of two witnesses.

DAVID SIMS.
JOHN HOSICK.

Witnesses:
ROBERT C. FOSTER,
HAMILTON ELLIS.